United States Patent [19]
Sampson

[11] Patent Number: 6,032,782
[45] Date of Patent: Mar. 7, 2000

[54] ASSEMBLY AND METHOD FOR TURNING ARTICLES

[76] Inventor: Richard J. Sampson, 4908 Idaho St., Vancouver, Wash. 98661

[21] Appl. No.: 08/812,431

[22] Filed: Mar. 7, 1997

[51] Int. Cl.$^7$ .................................................. B65G 47/244
[52] U.S. Cl. ........................ 198/374; 198/410; 198/463.4
[58] Field of Search ..................... 198/374, 410, 198/459.6, 463.4, 401; 414/759, 768

[56] References Cited

U.S. PATENT DOCUMENTS

| | | | |
|---|---|---|---|
| 2,370,325 | 2/1945 | Ranney | 198/410 X |
| 2,805,753 | 9/1957 | Palmer | 198/374 |
| 3,580,379 | 5/1971 | Shuster et al. | 198/401 |
| 4,055,246 | 10/1977 | Zalewski | 198/410 X |
| 4,085,839 | 4/1978 | Crawford | 198/410 |
| 4,883,162 | 11/1989 | Flot | 198/374 |

*Primary Examiner*—Janice L. Krizek
*Attorney, Agent, or Firm*—Marger Johnson & McCollom, P.C.

[57] ABSTRACT

An assembly and method for turning an article traveling on a conveyor. The assembly includes a conveyor having an upstream end and a downstream end, and first, second and third turning stations spaced apart from each other and disposed adjacent the path of a conveyor, with each station including a sensor for sensing an oncoming article and a selectively activatable surface, disposed downstream of said sensor, for turning an article 90 degrees. A computer selectively activates each of the surfaces responsive to information received from the sensors to thereby selectively turn an article either 90, 180 or 270 degrees total as desired.

25 Claims, 6 Drawing Sheets

ASSEMBLY AND METHOD FOR TURNING ARTICLES

BACKGROUND OF THE INVENTION

1. Field of the Invention

The present invention relates to an assembly and method for turning articles and, more particularly, to an assembly and method used to turn articles, such as cartons.

2. Description of the Related Art

There are several machines on the market which allow cartons or cases to be turned multiple times to allow for display pack or "labels out" automatic palletizing. Such palletizer infeed machines which are capable of accomplishing multiple turning of cases include Columbia Machine, Inc.'s Colmac 200T and 500T Case Palletizer which utilize a pop-up turntable for labels-out stacking of cases. The Colmac turntable lifts a case up from the conveyor and can rotate it 360 degrees in both directions. Another example of a machine for labels-out stacking is a triple turn infeed which uses "bump turns" in conjunction with case pushover mechanisms. Other types of machines use rotating star wheels or overhead rotatable clamps.

The primary problem with all of these machines is that they have limited speed capability. When manipulating case sizes of 12" by 18" by 8" filled with standard basis weight paper, for instance, none of the machines are able to achieve acceptable multiple turns at speeds in excess of 25–30 cases per minute. These machines are also expensive to build. Further, they have a number of moving parts which increases maintenance costs.

SUMMARY OF THE INVENTION

Accordingly, it is a general object of the present invention to provide an apparatus and method which overcomes the disadvantages associated with prior art turning assemblies.

It is a more specific object of the present invention to provide an assembly which quickly and efficiently processes different sized cartons and different stacking patterns without changing the entire operation of the palletizer system.

It is a further object of the present invention to provide an apparatus and method which can achieve multiple turns at speeds in excess of 25–30 cases per minute.

Yet another object of the invention is to provide a machine which is less expensive to build and is less expensive to maintain than the prior art machines.

These and other objects and advantages are accomplished by providing an assembly for turning articles which includes a conveyor for conveying articles, with the conveyor having an upstream end and a downstream end. The assembly further includes a surface, disposed adjacent the upstream end, for turning an article driven into contact with the surface by the conveyor and means for rendering the surface inoperable. A sensor is mounted adjacent the surface, for sensing an approaching first article located upstream from the surface. Also provided is computer means for selectively activating the rendering means in response to information received from the sensor.

The present invention also provides a method for turning articles for use in an assembly which includes a conveyor having a path with an upstream end and a downstream end, and a turning station having a surface for turning an article driven into contact with the surface by the conveyor, a retractable guide member for selectively activating the surface, a sensor for sensing an approaching first article located upstream from the surface, and further having computer means for selectively activating the guide members responsive to information received from the sensors. The method includes the steps of sensing the approach of an article traveling on the upstream path of the conveyor, sending information from the sensor to the computer means, selectively activating the guide member responsive to information received by the computer means from the sensor, and driving the article into contact with the surface.

Thus, it can be appreciated that this novel assembly and method disclosed above can be used selectively to turn articles traveling on a conveyor.

The foregoing and other objects and advantages of the present invention will become more readily apparent from the following detailed description of a preferred embodiment which proceeds with reference to the drawings.

DETAILED DESCRIPTION

Figure 1:
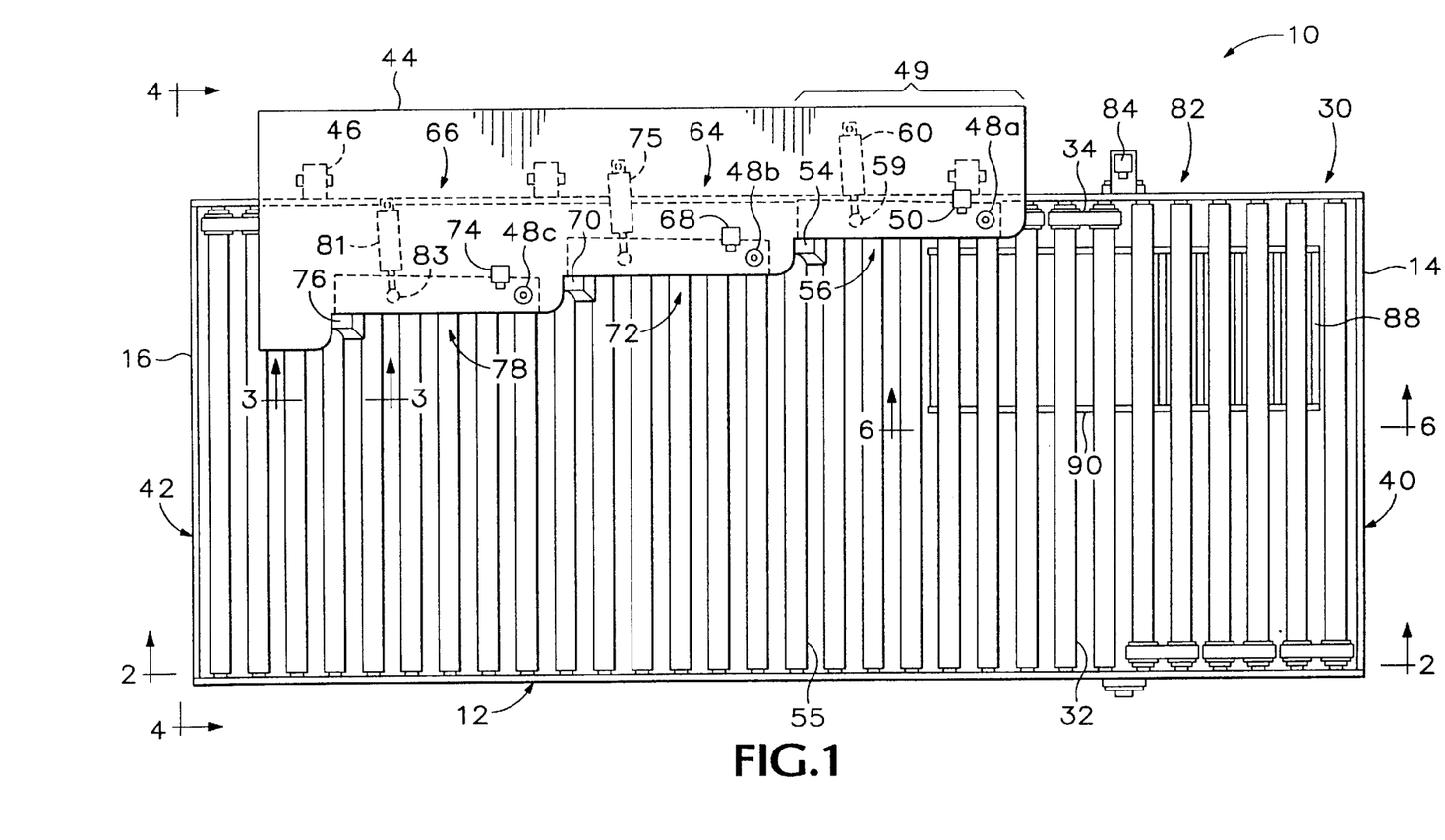
FIG. 1 is a top plan view of an assembly for turning articles, constructed in accordance with the present invention, with portions of the assembly shown in dashed lines.
Figures 2, 3:
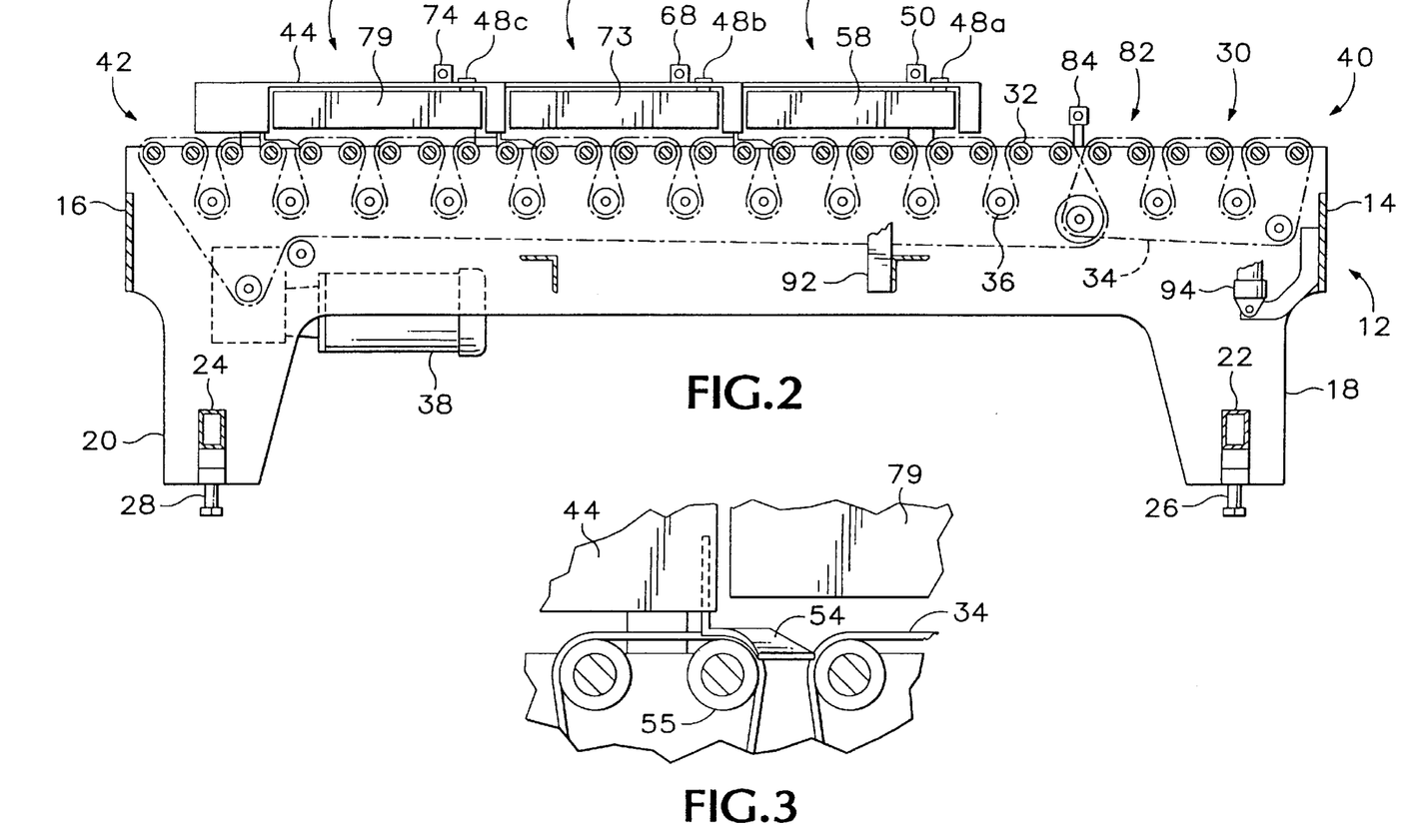
FIG. 2 is a sectional view of the assembly in FIG. 1, taken along line 2—2.
FIG. 3 is an enlarged sectional view of a portion of the assembly in FIG. 1, taken along line 3—3.

Turning now to FIGS. 1 and 2, shown generally at 10, is an assembly for turning articles incorporating the present invention. Assembly 10 includes a substantially rectangular frame, indicated generally at 12, having a front end 14 and a rear end 16 with a pair of opposed legs disposed at each end, such as legs 18, 20 shown in FIG. 2. Leg 18 is connected to leg 19 (not shown) by means of shaft 22, and similarly, leg 20 is connected to leg 21 (shown in FIG. 4) by means of shaft 24. The height of each leg may be threadably adjusted by rotating bolts 26, 28.

The assembly further includes a power-driven conveyor, such as the conveyor shown generally at 30, for conveying articles, such as cartons or cases containing products, which are being infed into a palletizer (not shown). As shown in FIGS. 1 and 2, conveyor 30 has a plurality of primary rollers, such as roller 32, with a continuous belt 34 trained over the rollers and respective, adjacent sprockets 36. Conveyor 30 is drivingly connected to a conventional power source, such as the power source shown generally at 38 in FIG. 2. Articles travel on conveyor 30 along a path having an upstream end 40 and a downstream end 42.

A cover plate 44 is pivotally mounted to frame 12 by hinges, such as hinge 46 seen in dashed lines in FIG. 1, and is connected to conveyor 30 by bolts, such as bolts 48a, 48b, 48c.

Figure 6:
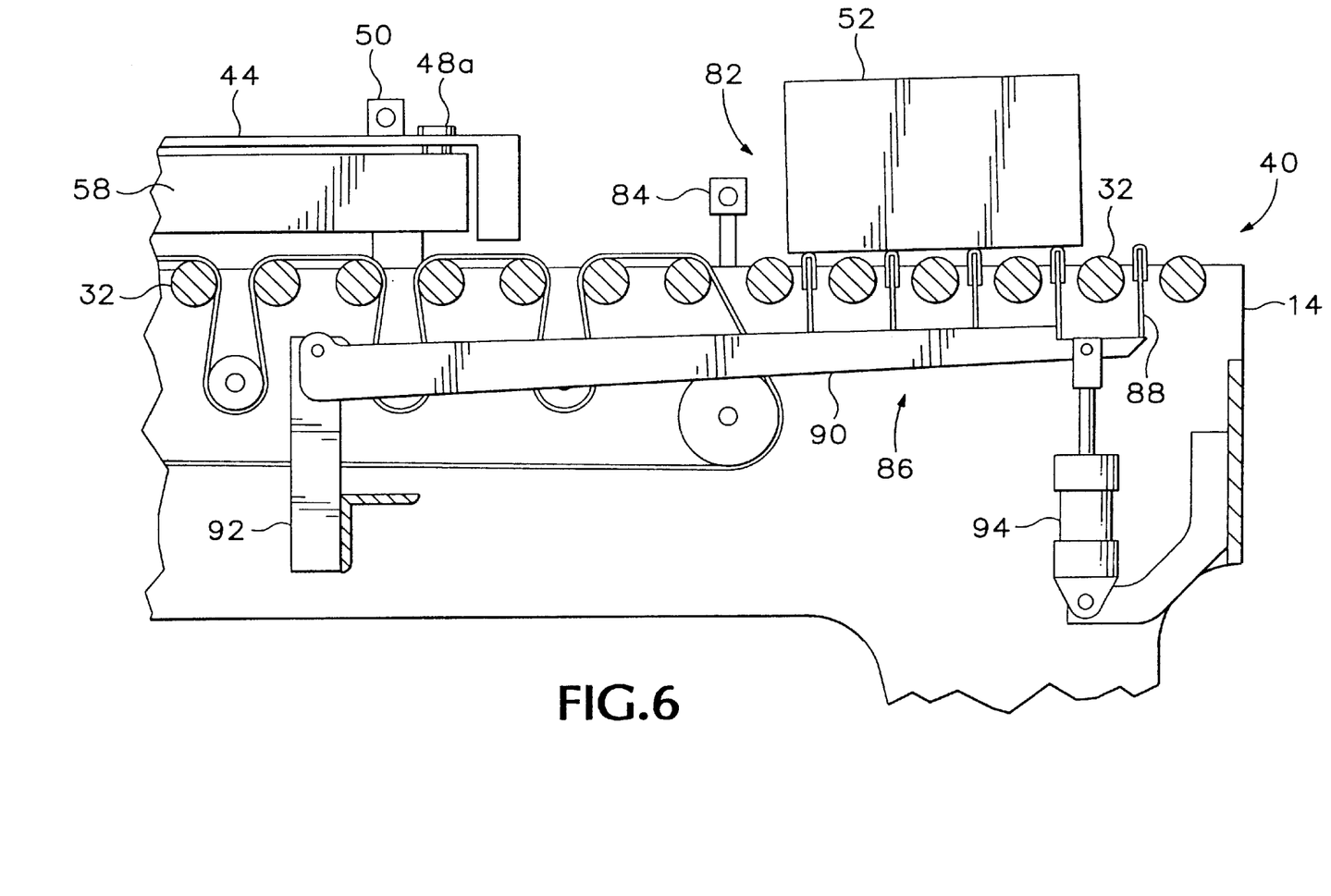
FIG. 6 is an enlarged partial sectional view of the upstream portion of the assembly in FIG. 1, taken along line 6—6, illustrating a delay station with a sensor and one embodiment of a delay device for delaying further forward movement of an article traveling on the conveyor.

As best illustrated in FIGS. 1, 6, 7 and 8, assembly 10 includes a first station 49 having a sensor 50 disposed adjacent upstream end 40 of conveyor 30 for sensing an approaching first article, such as article 52 seen in FIG. 6. In the preferred embodiment, sensor 50 is a photoelectric cell which detects the presence of an approaching article.

As best seen in FIGS. 1 and 3, first station 49 further includes a first surface 54, disposed downstream of sensor 50, for turning an article driven into contact with it by conveyor 30. In the preferred embodiment, surface 54 comprises a stair-like step which partially curves over an adjacent roller, such as roller 55. Upon being driven into contact with surface or step 54 by conveyor 30, an article is turned approximately 90 degrees.

First station 49 also includes means for rendering surface 54 inoperable. In the preferred embodiment, rendering means comprises a retractable guide member 56 mounted adjacent surface 54. Guide member 56 includes a flapper-type diverter arm 58 pivotally connected to cover 44 by bolt 48a adjacent its upstream end and connected at its downstream end to a pneumatic actuator, such as actuator 60, seen in FIGS. 1 and 7. Actuator 60 is attached at one end to arm 58 by means of bolt 59, and it is attached at its other end to cover plate 44.

Guide member 56 has two operable positions. In a first position, guide member 56 is in an extended position thereby causing surface 54 to be rendered inoperable, and, in a second position, guide member 56 is in a retracted position thereby allowing surface 54 to be operable to turn an article. In the first position in the embodiment shown in FIG. 7, actuator 60 is in an extended position which causes flapper arm 58 to pivot toward the center of the conveyor, thereby covering surface 54 by creating a diverter guide section 62 and rendering surface 54 inoperable to turn an article. In the preferred embodiment, in the second position, actuator 60 is in a retracted position with arm 58 pulled away from the center of the conveyor, thereby exposing surface 54 and allowing surface 54 to be operable to turn an article, as seen in FIG. 8.

Figure 7:
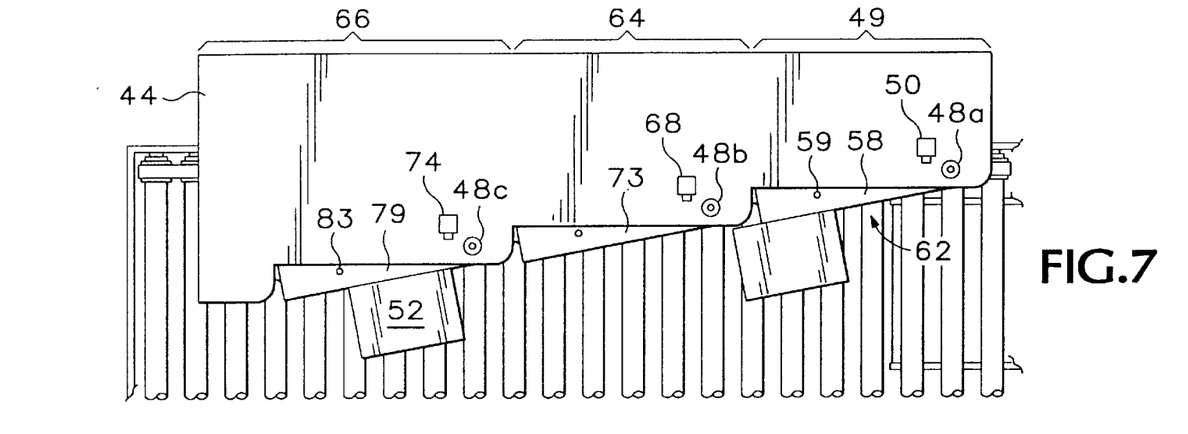
FIG. 7 is a slightly reduced top plan view of the assembly shown in FIG. 1 with portions removed, illustrating a condition wherein retractable guide members are in a fully extended position causing each of their respective surfaces to be inoperable and thereby allowing an article to travel on the conveyor without being turned.
Figure 8:
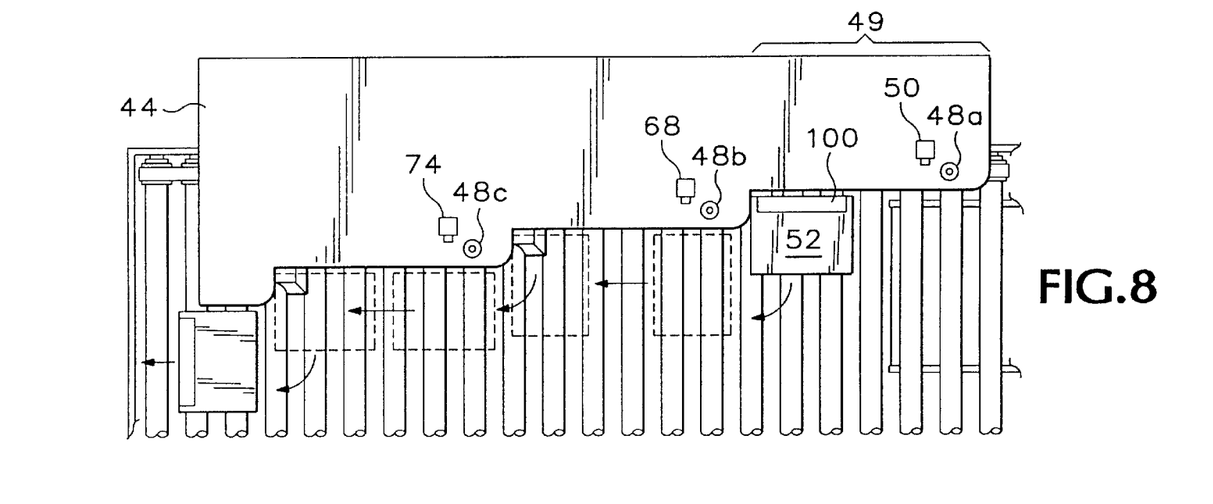
FIG. 8 is a slightly reduced top plan view of the assembly with portions removed, similar to FIG. 7, illustrating a condition wherein the retractable guide members are in a fully retracted position, exposing their respective surfaces and, thereby, allowing an article to be driven into each surface and be turned approximately a total of 270 degrees, as shown in dashed lines.

Second and third stations are provided, as shown generally at 64, 66 in FIGS. 1–2 and 7–9. Second and third stations 64, 66 are constructed substantially the same as first station 49. Second station 64 includes a second sensor or photocell 68 and a second surface or step 70. A second rendering means for retractable guide member, shown generally at 72, includes a flapper-type arm 73 pivotally connected to cover 44 by bolt 48b adjacent its upstream end and connected at its downstream end to a pneumatic actuator 75, as seen in FIGS. 1 and 7. Guide member 72 operates substantially the same as guide 56.

Figure 9:
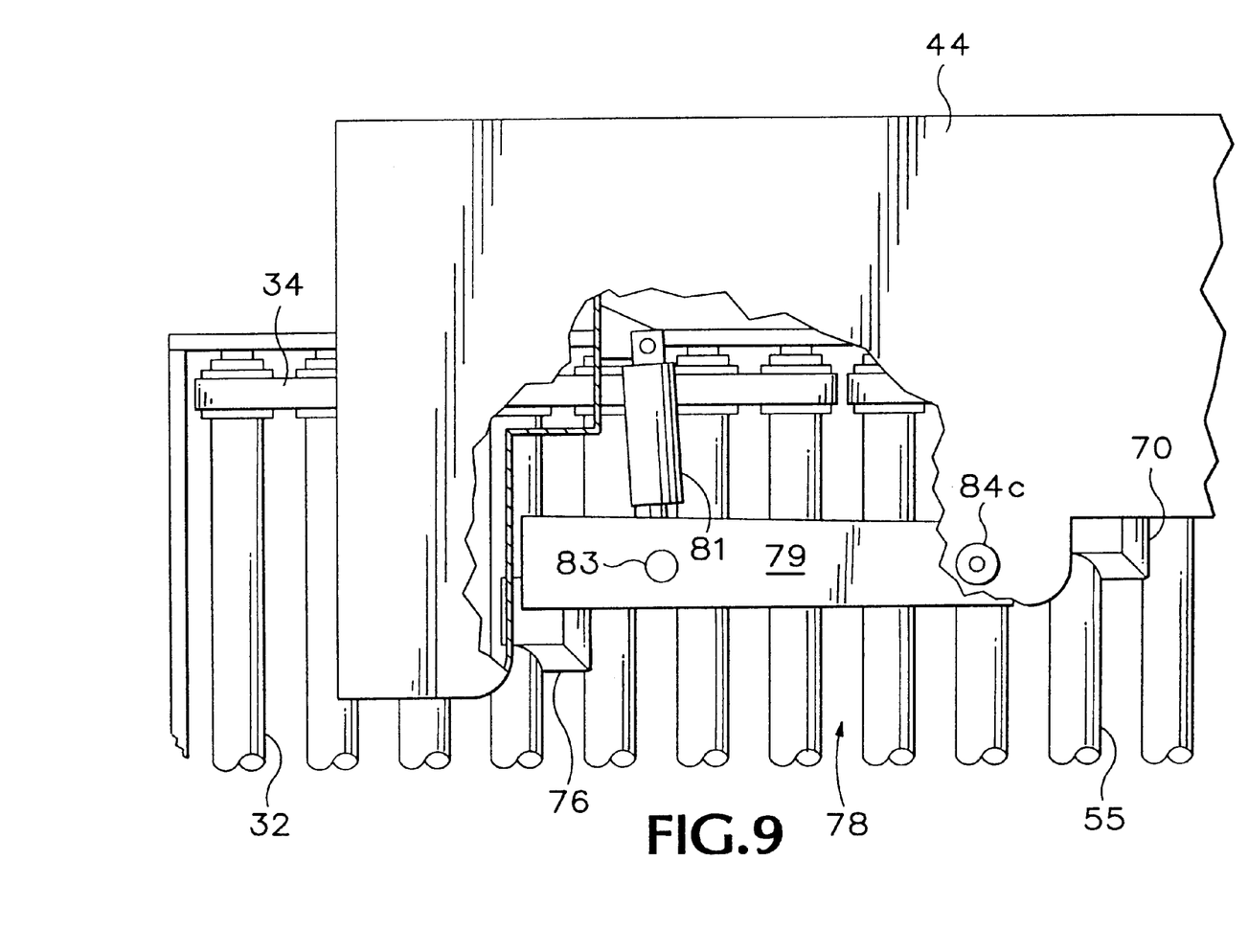
FIG. 9 is an enlarged partial top plan view of the assembly depicted in FIG. 1, with portions of the cover broken away to show a retractable guide member in a retracted position.

Third station 66 includes a third sensor or photocell 74, a third surface or step 76, and a third rendering means or retractable guide member, shown generally at 78, which has a flapper-type arm 79 pivotally connected to cover 44 by bolt 48c adjacent its upstream end and connected at its downstream end to a pneumatic actuator 81 by a bolt 83, best seen in FIGS. 1 and 9. Actuator 81 is attached at one end to arm 79 by means of bolt 83, and it is attached at its other end to cover plate 44.

A computer means (not shown) is provided for selectively activating guide members 56, 72, 78 responsive to information received from sensors 50, 68, 74. In the preferred embodiment, a conventional Industrial Programmable Logic Controller (PLC) Computer is used together with a Ladder Logic-type software program such as that used in the Allen Bradley Model No. SLC 503.

In order to quickly and efficiently process a large volume of articles, the assembly of the present invention includes a delay station, shown generally at 82 in FIGS. 1, 2, and 6, which is disposed upstream of first station 49, to delay the forward advancement of an article toward first station 49. Delay station 82 serves as a metering system to control the progress of articles traveling on conveyor 30 and stops every carton allowing a gap to be created between all cartons entering the infeed. Delay station 82 includes a sensor or photocell 84 which actuates a delay device, shown generally at 86.

In the embodiment shown, delay device 86 includes a plurality of vertical plates, such as plate 88, disposed intermediate a downstream section of conveyor rollers 32, to raise an article above the rollers. Each of the plates 88 are attached to a pivoting arm 90. Arm 90 is pivotally attached at one end to a fixed post 92 and on the other end to a pneumatic actuator 94. Actuator 94 is operably connected to the delay photocell 84 to move the pivoting arm 90 upward to a raised position when an article is detected by photocell 84. When arm 90 is in the raised position, each of plates 88 is moved upward, thus lifting article 52 from the surface of rollers 32 and consequently stopping its forward movement through the turning device. This same metering function could also be performed by using an auxiliary conveyor, disposed adjacent the upstream end of conveyor 30 and driven at different speeds from conveyor 30.

When delay sensor 84 detects the presence of an approaching article, information is sent by sensor 84 to the computer means. The computer means then activates delay device 86 and the article, such as article 52 in FIG. 6, is delayed from forward progress a predetermined amount of time, the length of which depends on the number of turns needed for the preceding box.

In the embodiment shown, while the driving conveyor rollers are parallel to the floor, the turning stations are mounted on the conveyor at a slight inward angle. Such positioning has the effect of driving each article securely into the corner of each step.

Figure 4:
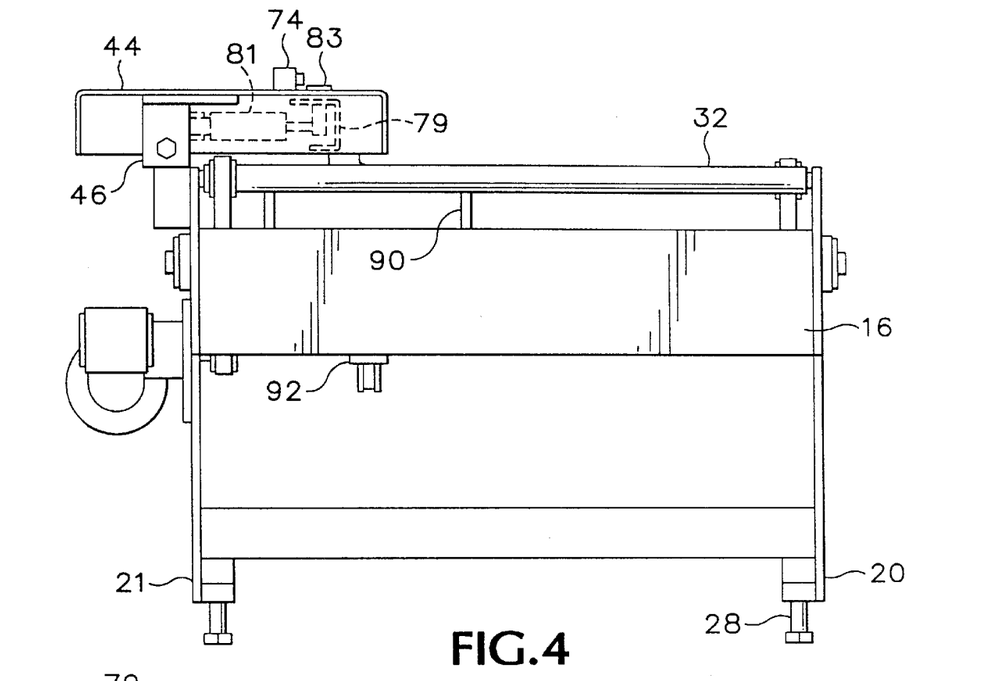
FIG. 4 is a slightly enlarged end view of the assembly in FIG. 1, taken from view 4—4, showing a cover in an operable position above a conveyor.
Figure 5:
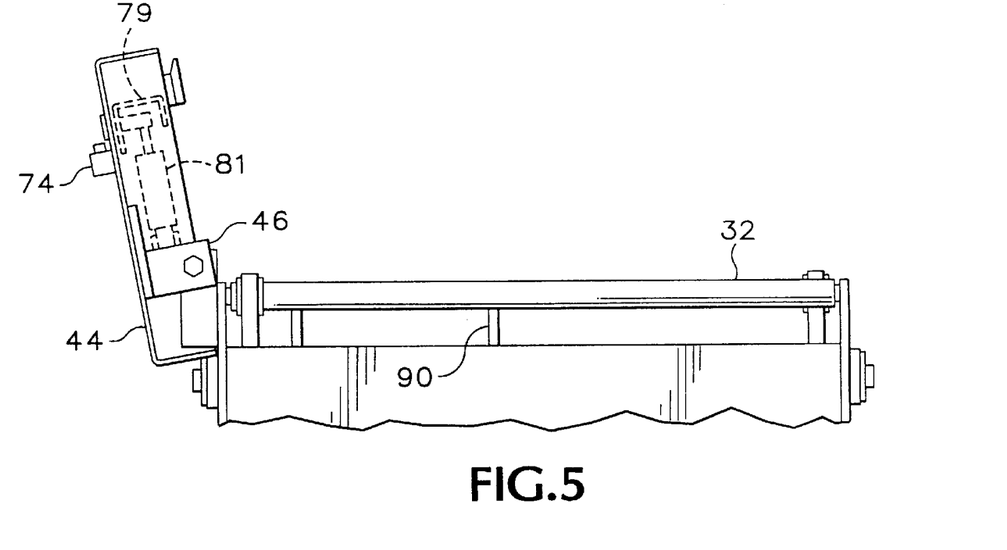
FIG. 5 is a slightly enlarged partial end view of the assembly, similar to FIG. 4, showing the cover pivoted upward away from the conveyor.

As illustrated in FIGS. 4 and 5, another important feature of the invention is that cover 44 can be easily moved by removing bolts 48a–c and rotating cover 44 backwardly about its hinges 46, so as to permit servicing and maintenance of the pneumatic actuators 60, 75, and 81 and conveyor 30.

While the assembly of the present invention has many applications, in the preferred embodiment shown here, the assembly is used to turn cartons coming from a casing machine, which seals the cartons containing products, such as paper, and sends them to a palletizer with each carton oriented in a predetermined direction. The assembly is programmed to provide for a sequence of turns, with the number of turns varying depending on the stacking pattern desired for the palletizer.

Turning to FIGS. 6–8, the sequence of operation of the assembly of the present invention is as follows. After the casing machine seals the carton, the carton is transferred to the upstream end of conveyor 30 adjacent delay station 82 with the carton's label, such as label 100 shown in FIG. 8, being in a predetermined orientation. Upon detecting its approach, delay sensor 84 sends that information to computer means 80 which activates delay device 86 and vertical plates 88 lift the carton above the conveyor, thereby delaying advancement of the carton for a predetermined amount of time. Then, the carton proceeds downstream toward first station 49. Upon approaching first station 49, first sensor 50 detects the presence of the carton and sends that information to the computer means. Then, depending on the selected pattern, the computer means activates or leaves inactive first guide flapper-type arm 58. If a turn is needed, then arm 58 is in a retracted position thereby allowing first surface 54 to be operable and the carton is turned when it is driven into contact with surface 54 by conveyor 30. If a turn is not desired, than arm 58 is in an extended position thereby causing surface 54 to be inoperable and no turn occurs. In the embodiment shown, first station 49 is used only for 270 degree turns.

The carton next proceeds to second station 64 where second sensor 68 detects its presence and sends that information to the computer means. Again, if a turn is needed, the computer means sends a signal to second guide flapper-type arm 73 which is placed in/remains in a retracted position or an extended position. If a turn is needed, then guide arm 73 is in a retracted position thereby allowing second surface 70 to be operable and the carton is turned when it is driven into contact with surface 70. In the embodiment shown, second station 64 is used for 180 and 270 degree turns.

The carton then proceeds to third station 66 where third sensor 74 detects its presence and sends that information to the computer means. Again, if a turn is needed, the computer means sends a signal to third guide flapper-type arm 79 which is placed in/remains in a retracted position or an extended position. If a turn is needed, then guide arm 79 is in a retracted position thereby allowing third surface 76 to be operable and the carton is turned when it is driven into contact with surface 76. In the embodiment shown, third station 66 is used for 90, 180 and 270 degree turns.

The carton is thereupon conveyed, as to a palletizer which receives the carton which has been properly oriented by the present assembly for stacking by the palletizer. The pattern needed for the palletizer to achieve special case orientation such as "labels out" stacking is determined by sizes of the cartons and the number of rows of cartons desired per pallet, with the object of the invention being to place a predetermined side of each carton on the outside of the palletized stack. This enables a worker quickly to determine what is in the stack by glancing at the outside of the stack where every carton's label is visible.

Thus, for a particular pattern and carton size, the sequencing of the guide members, such as members 56, 72, 78, as well as the conveyor speed is determined by a computer program which can be selected very simplistically by turning a knob to a single position. Because control is achieved primarily with sensing the position of the cartons via the photocells, the conveyor speed can be changed without having to change the operation of the rest of the system. One primary user of the present type of assembly would be refined paper suppliers who use five ream and ten ream boxes. Five ream boxes are produced at a faster rate than the larger ten ream boxes. This assembly is capable of achieving multiple turns at speeds in excess of 25–30 cases per minute and can efficiently process the five ream boxes.

Where a carton is to be turned 90 degrees, then first and second guide arms 58, 73 are in an extended position rendering first and second surfaces 54, 70 inoperable; and third guide arm 79 is placed in a retracted position rendering third surface 76 operable to turn the carton approximately 90 degrees.

Where a carton is to be turned 180 degrees, then first guide arm 58 is in an extended position rendering first surface 54 inoperable; and second and third guide arms 73, 79 are placed in a retracted position rendering second and third surfaces 70, 76 operable to turn the carton approximately a total of 180 degrees.

Where a carton is to be turned 270 degrees, then first, second and third guide arms 58, 73, 79 are placed in a retracted position rendering first, second and third surfaces 54, 70, 76 operable to turn the carton approximately a total of 270 degrees.

When a carton is to proceed unturned, then first, second and third guide members 56, 72, 78 are placed in an extended position rendering first, second and third surfaces 54, 70, 76 inoperable to turn the carton. Basically, when the guide members are in an extended position, the diverter arms 58, 73 and 79 respectively form a guide that diverts the carton past the turn device without turning. It is understood, however, that the guide members can be activated in any order to turn the carton or other article a desired amount.

The principal advantage of the present invention is that different sized cartons can be processed without a mechanical changeover of any type. All that is necessary is that the computer be programmed for the desired stacking sequence. Thus, it can be readily appreciated that the present invention can quickly and efficiently process different sized cartons and different stacking patterns without changing the entire operation of the palletizer.

While a preferred construction for, and methods of practicing the invention have been disclosed herein, it is appreciated that variation and modification may take place without departing from the spirit of the invention.

I claim:

1. An assembly for turning articles traveling on a conveyor having a path with an upstream end and a downstream end, the assembly comprising:

a station mounted adjacent the upstream end of said conveyor, with said station including a first sensor for sensing an oncoming article, a moveable diverter arm for diverting an oncoming article away from said first surface to prevent the article from turning, and computing means for using information from said first sensor to activate said diverter arm; and a first surface disposed downstream of said station for turning an article 90 degrees; and a second surface disposed downstream of said first surface for turning the article 90 degrees.

2. The assembly of claim 1, which further includes a delay sensor, disposed adjacent the upstream end of the conveyor, for sensing an oncoming first article traveling on the conveyor upstream of said sensor and a selectively activatable delay device for preventing further forward movement of said first article along the downstream end of the path of the conveyor, and wherein said computer means receives information from said delay sensor to activate said delay device.

3. The assembly of claim 1 further including a second station mounted downstream of the first surface, with said second station including a second sensor for sensing an oncoming article, a second moveable diverter arm for diverting an oncoming article away from said second surface to prevent the article from turning, and computing means for using information from said second sensor to activate said diverter arm.

4. The assembly of claim 1 further including a third station mounted downstream of the second surface, with said third station including a third surface, a third sensor for sensing an oncoming article, a third moveable diverter arm for diverting an oncoming article away from said third surface to prevent the article from turning, and computing means for using information from said third sensor to activate said diverter arm.

5. An assembly for turning articles comprising:
   a conveyor for conveying articles, said conveyor having an upstream end and a downstream end;
   a first surface, disposed adjacent the upstream end, for turning an article driven into contact with said first surface by said conveyor;
   a guide member mounted adjacent to said first surface and having a guiding surface operable against the article in a first activated position to guide the article so that it avoids contact with the first surface;
   a first sensor, mounted adjacent said guiding surface, for sensing an approaching first article located upstream from said first surface; and
   computer means for selectively activating said guide member, responsive to information received from said first sensor.

6. The assembly of claim 5 wherein said guide member includes a second activated position in which the article is allowed to impact the first surface.

7. The assembly of claim 5, wherein impact with said first surface causes an article to pivot approximately 90 degrees.

8. The assembly of claim 7, wherein said first surface comprises a step and wherein said guide member includes a retractable arm mounted upstream of said step.

9. The assembly of claim 5 further including:
   a second surface disposed downstream of the first surface for turning an article driven into contact with said second surface by said conveyor; and
   a second guide member mounted adjacent to said second surface and having a guiding surface operable against the article in a first activated position to guide the article so that it avoids contact with the second surface, said second guide member being independently operable via the computer means with the first surface so that the article to be turned can be selectively turned by one of the first or second surfaces, the first and second surfaces together, or neither of the first or second surfaces.

10. The assembly of claim 9, further including:
    a third surface disposed downstream of the second surface for turning an article driven into contact with said third surface by said conveyor; and
    a third guide member mounted adjacent to said third surface and having a guiding surface operable against the article in a first activated position to guide the article so that it avoids contact with the third surface, said third guide member being independently operable via the computer means with the first surface and the second surface so that the article to be turned can be selectively turned by one or two of the first, second, or third surfaces, the first, second, and third surfaces together, or none of the first, second, or third surfaces.

11. An assembly for turning articles comprising:
    a conveyor for conveying articles, said conveyor having an upstream end and a downstream end;
    a first surface, disposed adjacent the upstream end, for turning an article driven into contact with said first surface by said conveyor;
    first rendering means for rendering said first surface inoperable;
    a first sensor, mounted adjacent said first surface, for sensing an approaching first article located upstream from said first surface;
    a second surface disposed downstream of said first surface, for turning an article;
    a second sensor mounted adjacent said second surface, for sensing the orientation of an approaching first article located upstream from said second surface;
    second rendering means for rendering said second surface inoperable; and
    computer means for selectively activating said first rendering means, responsive to information received from said first sensor and to activate or inactivate said second rendering means responsive to information received from said second sensor.

12. The assembly of claim 11, wherein said second surface pivots said first article approximately 90 degrees, and wherein said first article is turned approximately a total of 180 degrees by said first and second surfaces.

13. The assembly of claim 11, which further includes a third surface disposed downstream of said second surface, for turning an article, and a third sensor mounted adjacent said third surface, for sensing the orientation of an approaching first article located upstream from said third surface, and further including third rendering means for rendering said third surface inoperable, said computer means including means to activate or inactive said third rendering means responsive to information received from said third sensor.

14. The assembly of claim 13, wherein each of said sensors is mounted upstream of its respective surface.

15. The assembly of claim 13, which further includes a delay sensor for sensing the oncoming first article traveling on the conveyor upstream of said first sensor, and a delay device for delaying further forward movement of said first article along the conveyor.

16. The assembly of claim 15, wherein said conveyor comprises a plurality of rollers and said delay device comprises a plurality of retractable, vertical plates for lifting an article off the conveyor.

17. The assembly of claim 15, wherein said delay device comprises an auxiliary conveyor in which the rollers are driven at a slower speed than the rollers in the primary conveyor.

18. The assembly of claim 13, wherein said third surface pivots said first article approximately 90 degrees, and wherein said first article may be turned approximately a total of 270 degrees by said first, second and third surfaces.

19. The assembly of claim 18, in a condition wherein each of said surfaces is rendered inoperable, the article proceeds along the path of the conveyor without being turned.

20. The assembly of claim 19, wherein said conveyor includes a substantially rectangular frame having a plurality of rollers mounted thereon and wherein said frame is constructed so that the height of one end thereof is higher than the other end and wherein said plurality of rollers lie in a plane which is parallel to a plane of the floor on which the frame rests.

21. The assembly of claim 18, wherein said assembly includes a first condition for turning an article 90 degrees, in which said computer means activates said first and second rendering means thereby rendering said first and second surfaces inoperable and wherein said computer means inactivates said third rendering means thereby rendering said third surface operable to turn the article.

22. The assembly of claim 21, wherein said assembly further includes a second condition for turning an article 180 degrees, in which said computer means activates said first rendering means thereby rendering said first surface inoperable and wherein said computer means inactivates said second and third rendering means thereby rendering said second and third surfaces operable to turn the article.

23. The assembly of claim 22, wherein said assembly further includes a third condition for turning an article 270 degrees, in which each of said rendering means is inactive and each of said surfaces is operable.

24. A method for turning an article for use in an assembly for turning articles traveling on a conveyor, with the assembly including a conveyor having a path with an upstream end and a downstream end, and a turning station including a surface for turning an article driven into contact with the surface by the conveyor, a retractable guide member for selectively activating the surface, a sensor for sensing an approaching first article located upstream from the surface, and further having computer means for selectively activating the guide member responsive to information received from the sensor, the method comprising the steps of:

sensing the approach of an article traveling from the upstream end of the path of the conveyor;

sending information from the sensor to the computer means;

selectively activating the guide member, responsive to information received by the computer means from the sensor; and driving the article along a first path into contact with the surface if the article is to be turned, otherwise driving the article along a second path around the surface.

25. The method of claim 24, wherein the assembly further includes a plurality of turning stations spaced apart from each other along the path of the conveyor, and wherein the steps of claim 24 are repeated at each turning station so that the article is turned at each station.

* * * * *